(12) United States Patent
Song et al.

(10) Patent No.: US 11,545,660 B2
(45) Date of Patent: Jan. 3, 2023

(54) LONG-LIFE AND ULTRA-HIGH ENERGY DENSITY LITHIUM SECONDARY BATTERY

(71) Applicant: LG CHEM, LTD., Seoul (KR)

(72) Inventors: Jun Hyuk Song, Daejeon (KR); Eun Kyung Kim, Daejeon (KR); Yong Ju Lee, Daejeon (KR); Sang Wook Woo, Daejeon (KR); Ju Ho Chung, Daejeon (KR); Suk In Noh, Daejeon (KR)

(73) Assignee: LG ENERGY SOLUTIONS, LTD., Seoul (KR)

( * ) Notice: Subject to any disclaimer, the term of this patent is extended or adjusted under 35 U.S.C. 154(b) by 159 days.

(21) Appl. No.: 16/851,755

(22) Filed: Apr. 17, 2020

(65) Prior Publication Data

US 2020/0251728 A1    Aug. 6, 2020

Related U.S. Application Data

(63) Continuation of application No. PCT/KR2018/012456, filed on Oct. 19, 2018.

(30) Foreign Application Priority Data

Oct. 20, 2017 (KR) .................. 10-2017-0136897

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/382* (2013.01); *H01M 4/525* (2013.01);
(Continued)

(58) Field of Classification Search
CPC .... H01M 4/366; H01M 4/667; H01M 4/8657; H01M 4/525; H01M 4/382; H01M 10/052; H01M 10/0525
See application file for complete search history.

(56) References Cited

U.S. PATENT DOCUMENTS

| 6,537,701 B1 | 3/2003 | Nimon et al. |
| 2002/0012846 A1 | 1/2002 | Skotheim et al. |

(Continued)

FOREIGN PATENT DOCUMENTS

| CN | 101038962 A | 9/2007 |
| CN | 102265431 A | 11/2011 |

(Continued)

OTHER PUBLICATIONS

Extended European Search Report, dated Oct. 9, 2020, for European Application No. 18868025.0.
(Continued)

*Primary Examiner* — Jeremiah R Smith
(74) *Attorney, Agent, or Firm* — Birch, Stewart, Kolasch & Birch, LLP (57) ABSTRACT

A lithium secondary battery, wherein there is a pre-lithiated negative electrode such that a total irreversible capacity of a positive electrode is greater than a total irreversible capacity of the negative electrode while satisfying 150< (negative electrode discharge capacity/lithium secondary battery discharge capacity)×100<300, and a relative potential of the negative electrode with respect to lithium metal in an operating voltage range of the lithium secondary battery is in a range of −0.1 V to 0.7 V. Such a lithium secondary battery is capable of maintaining a capacity retention of 60% or more even after 500 cycles or more while achieving an energy density per volume of 800 Wh/L or more.

9 Claims, 2 Drawing Sheets

(51) Int. Cl.
*H01M 4/525* (2010.01)
*H01M 10/052* (2010.01)
*H01M 10/0525* (2010.01)
*H01M 4/02* (2006.01)

(52) U.S. Cl.
CPC ..... *H01M 10/052* (2013.01); *H01M 10/0525* (2013.01); *H01M 2004/027* (2013.01)

(56) References Cited

U.S. PATENT DOCUMENTS

| | | |
|---|---|---|
| 2005/0008835 A1 | 1/2005 | Skotheim et al. |
| 2005/0008938 A1 | 1/2005 | Cho et al. |
| 2006/0051677 A1* | 3/2006 | Matsushima ......... H01M 4/70 |
| | | 429/231.95 |
| 2006/0102472 A1 | 5/2006 | Bito et al. |
| 2006/0102473 A1 | 5/2006 | Bito et al. |
| 2006/0222954 A1 | 10/2006 | Skotheim et al. |
| 2007/0218365 A1* | 9/2007 | Takezawa ............ H01M 4/382 |
| | | 427/124 |
| 2007/0221265 A1 | 9/2007 | Affinito et al. |
| 2007/0224502 A1 | 9/2007 | Affinito et al. |
| 2008/0014501 A1 | 1/2008 | Skotheim et al. |
| 2008/0057397 A1 | 3/2008 | Skotheim et al. |
| 2008/0241660 A1* | 10/2008 | Ogawa ................ H01M 50/431 |
| | | 429/122 |
| 2009/0291353 A1 | 11/2009 | Affinito et al. |
| 2010/0104948 A1 | 4/2010 | Skotheim et al. |
| 2010/0327811 A1 | 12/2010 | Affinito et al. |
| 2010/0330430 A1 | 12/2010 | Chung et al. |
| 2011/0014524 A1 | 1/2011 | Skotheim et al. |
| 2011/0159376 A1 | 6/2011 | Skotheim et al. |
| 2011/0165471 A9 | 7/2011 | Skotheim et al. |
| 2011/0239446 A1* | 10/2011 | Morishima ......... H01M 10/0525 |
| | | 29/623.5 |
| 2012/0037946 A1 | 2/2012 | Lee et al. |
| 2012/0043940 A1 | 2/2012 | Affinito et al. |
| 2012/0070742 A1 | 3/2012 | Chung et al. |
| 2012/0276449 A1 | 11/2012 | Skotheim et al. |
| 2013/0143096 A1 | 6/2013 | Affinito et al. |
| 2013/0280605 A1 | 10/2013 | Affinito et al. |
| 2013/0302688 A1 | 11/2013 | Takezawa |
| 2013/0314051 A1 | 11/2013 | Takezawa |
| 2014/0045075 A1 | 2/2014 | Skotheim et al. |
| 2014/0205912 A1 | 7/2014 | Skotheim et al. |
| 2015/0050533 A1 | 2/2015 | Nam et al. |
| 2015/0287986 A1 | 10/2015 | Affinito et al. |
| 2015/0318552 A1 | 11/2015 | Skotheim et al. |
| 2015/0340692 A1 | 11/2015 | Park et al. |
| 2016/0301080 A1 | 10/2016 | Skotheim et al. |
| 2016/0380271 A1* | 12/2016 | Ochiai ................... H01G 11/50 |
| | | 429/245 |
| 2017/0005334 A1 | 1/2017 | Takaichi et al. |
| 2017/0373321 A1 | 12/2017 | Skotheim et al. |
| 2018/0213672 A1 | 7/2018 | Eckberg et al. |
| 2019/0280286 A1* | 9/2019 | Song ................... H01M 10/052 |
| 2019/0341656 A1 | 11/2019 | Nam et al. |

FOREIGN PATENT DOCUMENTS

| | | |
|---|---|---|
| CN | 103283083 A | 9/2013 |
| EP | 2688135 A1 | 1/2014 |
| JP | 10-83834 A | 3/1998 |
| JP | 2004-165097 A | 6/2004 |
| JP | 2007-273459 A | 10/2007 |
| JP | 2008-226643 A | 9/2008 |
| JP | 2015-201283 A | 11/2015 |
| KR | 10-2005-0007484 A | 1/2005 |
| KR | 10-0790271 B1 | 1/2008 |
| KR | 10-1156608 B1 | 6/2012 |
| KR | 10-1264337 B1 | 5/2013 |
| KR | 10-2013-0134949 A | 12/2013 |
| KR | 10-2014-0032577 A | 3/2014 |
| KR | 10-2015-0020022 A | 2/2015 |
| KR | 10-2015-0028206 A | 3/2015 |
| KR | 10-1594784 B1 | 2/2016 |
| WO | WO 02/41416 A2 | 5/2002 |
| WO | WO 2012/101970 A1 | 8/2012 |
| WO | WO 2015/111710 A1 | 7/2015 |

OTHER PUBLICATIONS

International Search Report (PCT/ISA/210) issued in PCT/KR2018/012456, dated Mar. 14, 2019.

Sandhya et al., "Sn/Al2O3/C/CNT composite prepared by wet milling as anode material for lithium-ion cells," Journal of Science: Advanced Materials and Devices, vol. 2, No. 2, Apr. 2017, pp. 210-214.

* cited by examiner

FIG. 1

FIG. 2 ical potential of the carbon-based compound during the intercalation and deintercalation of lithium ions is similar to that of lithium metal, lithium precipitation due to overpotential occurs even at a slightly higher charge current. Since the lithium precipitation is further accelerated as charge and discharge are repeated, it causes a short circuit due to dendrites as well as a reduction in capacity. Thus, it may have a great impact on safety, and it is vulnerable to safety, for example, when an amount of lithium greater than an amount of lithium receivable from the negative electrode is charged by overcharge of the battery, the temperature increases to cause an exothermic reaction which leads to ignition and explosion of the battery.
LONG-LIFE AND ULTRA-HIGH ENERGY DENSITY LITHIUM SECONDARY BATTERY

CROSS-REFERENCE TO RELATED APPLICATIONS

This application is a By-Pass Continuation of PCT/KR2018/012456, filed Oct. 19, 2018, which claims the benefit of Korean Patent Application No. 10-2017-0136897, filed on Oct. 20, 2017, in the Korean Intellectual Property Office, the disclosures of which are expressly incorporated herein in their entireties by reference.

TECHNICAL FIELD

The present invention relates to a lithium secondary battery which may improve energy density and life performance at the same time.

BACKGROUND ART

The demand for batteries as an energy source has significantly increased as technology development and demand with respect to mobile devices have recently increased, and, as a hybrid electric vehicle (HEV), a plug-in hybrid electric vehicle (PHEV), and an electric vehicle (EV) have received attention as future cars, a variety of research on batteries capable of meeting various needs have been carried out accordingly. Particularly, as a power source for such devices, research into lithium secondary batteries having excellent lifetime and cycle characteristics as well as high energy density has been actively conducted.

In this regard, a carbon-based compound capable of reversibly intercalating and deintercalating lithium ions while maintaining structural and electrical properties has been mainly used as a negative electrode active material of a negative electrode of a conventional lithium secondary battery, but the improvement in energy density per volume of the conventional battery material has arguably reached its limit.

The energy density is ensured through high densification and thinning of subsidiary material, but the current limit is at most 750 Wh/L per volume, and further thinning is difficult in terms of process. Particularly, since a chemical potential of the carbon-based compound during the intercalation and deintercalation of lithium ions is similar to that of lithium metal, lithium precipitation due to overpotential occurs even at a slightly higher charge current. Since the lithium precipitation is further accelerated as charge and discharge are repeated, it causes a short circuit due to dendrites as well as a reduction in capacity. Thus, it may have a great impact on safety, and it is vulnerable to safety, for example, when an amount of lithium greater than an amount of lithium receivable from the negative electrode is charged by overcharge of the battery, the temperature increases to cause an exothermic reaction which leads to ignition and explosion of the battery.

Accordingly, various negative electrode materials, for example, a silicon-based material, such as pure-Si, $SiO_x$, and a composite of SiC or the like, a tin (Sn)-based material, an oxide-based material, and lithium metal, have recently been studied to dramatically improve the energy density. However, silicon, one of the most promising next-generation negative electrode materials, has very high capacity, but battery degradation due to high volume expansion is considered to be the most important issue.

Therefore, there is a need for a lithium secondary battery which may address such an issue and may simultaneously improve ultra-high energy density and life performance.

PRIOR ART DOCUMENT

Patent Document (Patent Document 1) Korean Patent No. 10-1594784 (Publication 2016.02.11)

DISCLOSURE OF THE INVENTION

Technical Problem

An aspect of the present invention provides an ultra-high energy density and long-life lithium secondary battery in which capacity retention may be maintained at 60% or more even after 500 cycles or more while achieving an energy density per volume of 800 Wh/L or more.

Technical Solution

Figure 2:
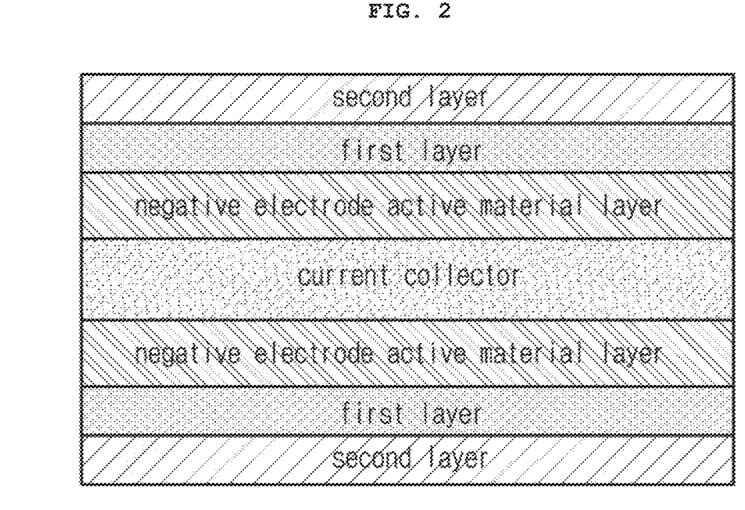
FIG. 2 is an illustration of a negative electrode according to an embodiment of the present invention.

According to an aspect of the present invention, there is provided a lithium secondary battery including a negative electrode, a positive electrode, a separator, and an electrolyte, wherein, as illustrated in FIG. 2, the negative electrode includes a current collector;

a pair of negative electrode active material layers, which include a negative electrode active material, disposed on both surfaces of the current collector, respectively;

a pair of first layers, each disposed on respective surfaces of the negative electrode active material layers opposite the current collector, which first layers include lithium (Li); and a pair of second layers, each disposed on respective surfaces of the first layers opposite the negative electrode active material layer, which second layers include an inorganic material, wherein a total irreversible capacity of the positive electrode is greater than a total irreversible capacity of the negative electrode while the lithium secondary battery satisfies the following Equation 1, and a relative potential of the negative electrode with respect to lithium metal in an operating voltage range of the lithium secondary battery is in a range of −0.1 V to 0.7 V, $$150 < (\text{negative electrode discharge capacity/lithium secondary battery discharge capacity}) \times 100 < 300, \quad [\text{Equation 1}]$$

wherein the negative electrode discharge capacity is discharge capacity of the negative electrode, wherein it is a value measured by preparing a coin half-cell which includes the negative electrode, as a positive electrode, and the lithium metal as a negative electrode).

Advantageous Effects

Since one embodiment of a lithium secondary battery according to the present invention is characterized in that it includes a pre-lithiated negative electrode (due to the first layers discussed above), a total irreversible capacity of the positive electrode is greater than a total irreversible capacity of the negative electrode while satisfying 150<(negative electrode discharge capacity/lithium secondary battery discharge capacity)×100<300, and a relative potential of the negative electrode with respect to lithium metal in an operating voltage range of the lithium secondary battery is in a range of −0.1 V to 0.7 V, energy density and life performance may be improved at the same time.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

One aspect of the present invention provides a lithium secondary battery including a negative electrode, a positive electrode, a separator, and an electrolyte, wherein the negative electrode includes a current collector; a pair of negative electrode active material layers, which includes a negative electrode active material, disposed on both surfaces of the current collector, respectively;

a pair of first layers, each disposed on respective surfaces of the negative electrode active material layers opposite the current collector, which first layers include lithium (Li); and a pair of second layers, each disposed on respective surfaces of the first layers opposite the negative electrode active material layer, which second layers include an inorganic material, wherein a total irreversible capacity of the positive electrode is greater than a total irreversible capacity of the negative electrode while the lithium secondary battery satisfies the following Equation 1, and a relative potential of the negative electrode with respect to lithium metal in an operating voltage range of the lithium secondary battery is in a range of −0.1 V to 0.7 V, 150<(negative electrode discharge capacity/lithium secondary battery discharge capacity)×100<300,   [Equation 1]

wherein the negative electrode discharge capacity is discharge capacity of the negative electrode, wherein it is a value measured by preparing a coin half-cell which includes the negative electrode, as a positive electrode, and the lithium metal as a negative electrode.

An object of the present invention is to provide a lithium secondary battery capable of addressing conventional technical problems and simultaneously improving ultra-high energy density and life performance, wherein, specifically, an object of the present invention is to provide a long-life and ultra-high energy density lithium secondary battery having an energy density per volume of 800 Wh/L or more and capable of maintaining a capacity retention of 60% or more even after 500 cycles or more.

One key to achieving the object of the present invention is to move a main use area of the negative electrode by preparing a lithium secondary battery which includes the negative electrode pre-lithiated, for instance, under specific conditions, and has a total irreversible capacity of the positive electrode greater than a total irreversible capacity of the negative electrode while satisfying 150<(negative electrode discharge capacity/lithium secondary battery discharge capacity)×100<300, wherein energy density and life performance may be satisfied at the same time when an amount of movement of the use area to a specific section in the corresponding system is satisfied.

In this respect, one aspect of the present invention relates to a technique separate from the control of charge/discharge potential upper and lower limits in a device or a module in which a completed secondary battery is used, and, for a secondary battery assembled by combining typical simple positive electrode material and negative electrode material, the use area in the specific section is an area that may not be derived by initial efficiency inherent in a commercial material.

In order to derive the specific use area of the negative electrode of the present invention, pre-lithiation of the negative electrode may be employed. Since the pre-lithiation of the negative electrode may not only prepare a high-capacity lithium secondary battery, but may also replenish the depletion of lithium ions which occurs as the number of cycles increases, the pre-lithiation of the negative electrode may significantly improve cycle life.

Particularly, the pre-lithiated negative electrode of the present invention includes:

a negative electrode collector;

a pair of negative electrode active material layers including a negative electrode active material disposed on both surfaces of the collector, respectively;

a pair of first layers, each disposed on respective surfaces of the negative electrode active material layers opposite the current collector, which first layers include Li; and a pair of second layers, each disposed on respective surfaces of the first layers opposite the negative electrode active material layer, which second layers include an inorganic material.

According to one aspect of the pre-lithiated negative electrode of the present invention, since the second layers including the inorganic material are formed on each of the first layers including lithium, the generation of a natural oxide layer formed by oxidation of the lithium may be prevented in the process, and thus, an irreversible capacity problem may be smoothly solved.

Furthermore, the irreversible capacity problem may be more effectively solved by further limiting thickness and loading amount of the first layer, and this may allow the movement toward a negative electrode potential.

The first layers of the pre-lithiated negative electrode of the present invention may each have a thickness of 2.5 μm to 4.5 μm, for example, 3.0 μm to 4.0 μm, and this is to limit a proper negative electrode potential. In a case in which the thickness of each of the first layers is less than 2.5 μm, cycle degradation due to an increase in negative electrode discharge potential may occur, and, in a case in which the thickness of each of the first layers is greater than 4.5 μm, since a negative electrode state of charge may be increased, lithium precipitation and excessive swelling of the secondary battery may occur.

A negative electrode active material of the present invention may include a high-capacity single negative electrode active material having a capacity of 1,000 mAh/g or more. The negative electrode active material of one aspect of the present invention may include at least one selected from the group consisting of silicon (Si), tin (Sn), titanium (Ti), aluminum (Al), lead (Pb), zinc (Zn), bismuth (Bi), indium (In), magnesium (Mg), gallium (Ga), and cadmium (Cd). This may be used in preparing a secondary battery in which life characteristics may be maintained by controlling the swelling while ensuring the energy density per volume, and this is due to the fact that there is no gain in energy density compared to a conventional secondary battery system by using a carbon-based active material having small capacity per volume or a negative electrode active material having a capacity of less than 1,000 mAh/g in the present invention.

As shown in FIG. 2, structurally, each first layer may be disposed on the underlying negative electrode active material layer. The first layers may include Li, and may be specifically formed of Li. The Li included in the first layers may offset the irreversible capacity of the negative electrode by being intercalated into the negative electrode during initial charge. In general, the irreversible capacity of the negative electrode is generated by the remaining of a portion of lithium, which is transferred from the positive electrode to the negative electrode during first charge, in the negative electrode in accordance with a film-forming reaction of the negative electrode and unused lower limit potential. According to one aspect of the present invention, the lithium of the first layers may undergo an equilibrium reaction with the negative electrode active material layer during the injection of an electrolyte solution after assembly of the battery, and the lithium of the first layers not participating in the reaction is intercalated into the negative electrode. Accordingly, during subsequent charge, the amount of lithium transferred from the positive electrode to the negative electrode may be reduced. Thus, since the state of charge may be reduced, structural collapse of the positive electrode material may be suppressed, and a state of charge (SOC) corresponding to a low resistance portion of the entire SOC of the negative electrode may be used as a practical use area of the battery. Accordingly, capacity of the secondary battery may be increased and life characteristics may be improved.

Also, the second layers in the negative electrode of the present invention may be disposed on the underlying first layers.

The second layers may include an inorganic material, and, specifically, the second layers may be formed of the inorganic material. Since the second layers may prevent the oxidation of the lithium included in the first layers, the irreversible capacity of the negative electrode may be smoothly offset by the Li. Furthermore, when the negative electrode is used with the separator, mechanical stability, for example, heat resistance of the separator may be improved.

The inorganic material may include at least one selected from the group consisting of $Al_2O_3$, $SiO_2$, and $ZrO_2$, and may specifically include $Al_2O_3$.

The second layers may each have a thickness of 50 nm to 500 nm, for example, 100 nm to 200 nm. In a case in which the thickness of each of the second layers satisfies the above range of 50 nm to 500 nm, oxidation of the first layers may be effectively prevented, and an excessive decomposition reaction of the electrolyte solution may be suppressed. In addition, the energy density may be maintained at an appropriate level, and degradation of battery performance may be prevented because interfacial resistance is not large. Also, battery stability may be improved, for example, the second layers may each be disposed between the negative electrode and separator layer after the assembly of the battery to prevent breakage of the separator.

A method of preparing the pre-lithiated negative electrode of the present invention may include: disposing a pair of negative electrode active material layers, including a negative electrode active material on both surfaces of a current collector; vapor depositing a pair of first layers including Li on respective surfaces of the negative electrode active material layer opposite the current collector using a raw material including Li as a source; and disposing a pair of second layers including an inorganic material on respective surfaces of the first layers opposite the negative electrode active material layer.

The current collector of the present invention is not particularly limited as long as it has conductivity without causing adverse chemical changes in the battery, and, for example, stainless steel, aluminum, nickel, titanium, fired carbon, OE aluminum or stainless steel that is surface-treated with one of carbon, nickel, titanium, or silver may be used.

Since the method of preparing the pre-lithiated negative electrode of the present invention may easily control a loading amount of each of the first layers by forming the first layers by, for instance, a vapor deposition method, capacity and lifetime of the negative electrode may be improved. Furthermore, since the oxidation of lithium may be further prevented by the second layers and the heat resistance of the separator may be improved when the negative electrode is used with the separator, the stability of the battery may be improved.

The disposing of the negative electrode active material layers on both surfaces of the current collector may include coating a composition for forming the negative electrode active material layers on both surfaces of the current collector and drying the composition. The composition for forming a pair of negative electrode active material layers may include a solvent including a negative electrode active material. The composition with the solvent may further include a binder and a conductive agent. The solvent may include at least one selected from the group consisting of distilled water and polyvinylidene fluoride (PVDF), but the present invention is not limited thereto.

In the vapor depositing of the first layers including Li on the negative electrode active material layers using the raw material including Li as a source, the raw material including Li may be Li.

The vapor deposition process may accompany a heating process. In this case, in order to reduce deformation of the current collector and the binder, a heating temperature may be 60° C. or less. Thus, the vapor depositing of the first layers may be performed by at least one method selected from the group consisting of sputtering, e-beam, thermal evaporation, and atomic layer deposition, and may be specifically performed by sputtering.

When the sputtering method is used, a deposition rate may be adjusted by sputtering power and partial pressure of gas, such as Ar or $N_2$. In consideration of productivity while uniformly forming the first layers, the sputtering power may be in a range of 60 W to 90 W, and the gas partial pressure may be in a range of 5 mtorr to 15 mtorr.

In a case in which the pair of first layers is formed by vapor deposition, an excessively large loading amount of the first layers may be prevented. Also, since the oxidation of lithium may be effectively prevented in the process in comparison to a conventional process of forming a lithium layer in the form of a lithium foil, the battery performance, such as life characteristics, may be improved.

The disposing of the pair of second layers may be performed by at least one method selected from the group consisting of sputtering, e-beam, atomic layer deposition, and other organic-based wet-coating methods, and may be specifically performed by sputtering.

The positive electrode included in the lithium secondary battery of the present invention may include a positive electrode collector and a positive electrode active material layer which is formed on the positive electrode collector, which positive electrode active material layer includes a positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, or silver may be used.

With respect to the present invention, a positive electrode active material having an initial efficiency of about 90% may be used as the positive electrode active material. In general, there is a tendency that the higher the content of cobalt (Co) is, the more the initial efficiency is increased (LiCoO$_2$=98%), wherein, in order to use the corresponding potential region of the negative electrode in the present invention, it is preferable to use an NCM (Ni:Co:Mn)-based material having a nickel (Ni) ratio of 0.5 or more and a Co ratio of 0.3 or less, a lithium nickel composite oxide represented by a formula of LiNi$_{1-a}$M$_a$O$_2$ (where M is at least one selected from the group consisting of Co, manganese (Mn), aluminum (Al), copper (Cu), iron (Fe), magnesium (Mg), boron (B), and gallium (Ga), and a satisfies $0.01 \leq a \leq 0.3$) may be used, and, specifically, Li(Ni$_{0.8}$Co$_{0.1}$Mn$_{0.1}$)O$_2$ may be used.

The separator of the present invention separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

The electrolyte of the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

Examples of the non-aqueous organic solvent may include aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

A lithium salt may be used as the metal salt, and the lithium salt may be a material that is readily soluble in the non-aqueous electrolyte solution, wherein, for example, any one selected from the group consisting of F—, NO$_3$—, N(CN)$_2$—, BF$_4$—, ClO$_4$—, PF$_6$—, (CF$_3$)$_2$PF$_4$—, (CF$_3$)$_3$PF$_3$—, (CF$_3$)$_4$PF$_2$—, (CF$_3$)$_5$PF—, (CF$_3$)$_6$P—, CF$_3$SO$_3$—, CF$_3$CF$_2$SO$_3$—, CF$_3$SO$_2$)$_2$N—, (FSO$_2$)$_2$N—, CF$_3$CF$_2$(CF$_3$)$_2$CO—, (CF$_3$SO$_2$)$_2$CH—, (SF$_5$)$_3$C—, (CF$_3$SO$_2$)$_3$C—, CF$_3$(CF$_2$)$_7$SO$_3$—, CF$_3$CO$_2$—, CH$_3$CO$_2$—, SCN—, and (CF$_3$CF$_2$SO$_2$)$_2$N— may be used as an anion of the lithium salt.

An aspect of the present invention may prepare a lithium secondary battery by assembling the pre-lithiated negative electrode, the positive electrode, the separator, and the electrolyte by a conventional method of assembling a lithium secondary battery.

The lithium secondary battery of the present invention may be characterized in that it has an energy density per volume of 800 Wh/L or more, particularly 900 Wh/L or more, and more particularly 1,000 Wh/L or more, and has life characteristics in which capacity retention may be maintained at 60% or more, particularly 70% or more, and more particularly 80% or more even after 500 cycles or more.

Even in a case in which the lithium secondary battery of the present invention includes the negative electrode pre-lithiated under specific conditions, in order achieve a long-life and ultra-high energy density, it may be an aspect of the lithium secondary battery that the total irreversible capacity of the positive electrode is greater than the total irreversible capacity of the negative electrode while satisfying conditions of the following Equation 1, and a relative potential of the negative electrode with respect to lithium metal in an operating voltage range of the lithium secondary battery is in a range of −0.1 V to 0.7 V, for example, 0 V to 0.6 V.

$$150 < (\text{negative electrode discharge capacity/lithium secondary battery discharge capacity}) \times 100 < 300, \quad [\text{Equation 1}]$$

wherein the negative electrode discharge capacity is the discharge capacity of the negative electrode, wherein it is a value measured by preparing a coin half-cell which includes the negative electrode, as a positive electrode, and the lithium metal as a negative electrode.

Specifically, the negative electrode discharge capacity is discharge capacity of the negative electrode separated from the lithium secondary battery, wherein it denotes a discharge capacity value measured by preparing a coin half-cell which includes the corresponding electrode, as a positive electrode, and the lithium metal as a negative electrode, fully charging the coin half-cell, and then fully discharging the coin half-cell, and the lithium secondary battery discharge capacity denotes a discharge capacity value measured by fully charging the lithium secondary battery of the present invention and then fully discharging the lithium secondary battery.

Specifically, a reason for the lithium secondary battery of the present invention to satisfy Equation 1 is to limit a large displacement of contraction and expansion of the negative electrode active material so as to satisfy long-life characteristics, and, simultaneously, to satisfy high energy density by limiting a battery volume to a certain level.

Also, the lithium secondary battery of the present invention may be one in which the total irreversible capacity of the positive electrode is greater than the total irreversible capacity of the negative electrode.

This may prevent degradation due to a short circuit of the negative electrode active material having large capacity and large contraction-expansion coefficient during discharge of the negative electrode.

Furthermore, the present invention may be one in which the relative potential of the negative electrode of the present invention with respect to lithium metal in an operating voltage range of the lithium secondary battery is in a range of −0.1 V to 0.7 V, for example, 0 V to 0.6 V. The relative potential of the negative electrode may be obtained by three-electrode test in which a reference electrode is inserted, or by measuring a potential difference in a coin cell which is prepared by separating the negative electrode from the fully charged secondary battery and then reassembling the separated negative electrode and the lithium metal.

Specifically, if the operating voltage range is set to 4.2 V to 2.5 V, the relative potential of the negative electrode with respect to the lithium metal at a full charge potential of 4.2 V may be −0.1 V or more, for example, 0 V or more, and the relative potential of the negative electrode with respect to the lithium metal at a full discharge potential of 2.5 V may be 0.7 V or less, for example, 0.6 V or less.

The relative potential of the negative electrode with respect to the lithium metal at a full charge potential and the relative potential of the negative electrode with respect to the lithium metal at a full discharge potential are ranges which may not be obtained by a combination of commercial positive/negative electrode materials without a pre-lithiation process that satisfies Equation 1 of the present invention.

Specifically, since silicon has a theoretical maximum capacity of about 4,020 mAh/g (9,800 mAh/cc, specific gravity: 2.23) which is much greater than that of a carbon-based material, the silicon has been in the spotlight as a high-capacity negative electrode material.

However, the silicon has a limitation in that cycle life of a battery may be reduced because a negative electrode is degraded while the silicon is subjected to repeated expansion (up to 4 times) and contraction, which are much greater than those of the carbon-based active material, during charge and discharge.

Specifically, when reacting with lithium to exhibit the maximum theoretical capacity, a volume expansion rate of a carbon-based compound (e.g., graphite) is about 10%, but the above materials exhibit a volume expansion of 100% or more and a maximum volume expansion of 400%. In general, the greater the volume change is, the higher the capacity is, but the volume change damages the electrode itself during battery operation and reduces lifetime of the battery due to a reduction in interfacial adhesion to the current collector.

This phenomenon is further intensified as the amount of the high-capacity negative electrode active material is increased to prepare a high energy density cell. Thus, the lithium secondary battery of the present invention may be one in which the lithium secondary battery includes a pre-lithiated negative electrode, wherein the total irreversible capacity of the positive electrode is greater than the total irreversible capacity of the negative electrode while satisfying the following Equation 1, and the relative potential of the negative electrode with respect to lithium metal in an operating voltage range of the lithium secondary battery is in a range of −0.1 V to 0.7 V so as to achieve a range in which optimum life characteristics and maximum energy density of the silicon negative electrode may be obtained at the same time.

$$150<(\text{negative electrode discharge capacity/lithium secondary battery discharge capacity})\times100<300. \quad \text{[Equation 1]}$$

Also, the present invention may provide a battery module including the lithium secondary battery of the present invention and a battery pack used as a power source of at least one medium and large sized device selected from the group consisting of a power tool, an electric vehicle, a hybrid electric vehicle, a plug-in hybrid electric vehicle, and a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLE 1

1. Preparation of Positive Electrode

A Li[Ni$_{0.8}$Mn$_{0.1}$Co$_{0.1}$]O$_2$ positive electrode active material (initial efficiency: 90%), KF1100 as a binder, and Super-C as a conductive agent, were mixed with N-methyl-2-pyrrolidone (NMP), as a solvent, in a weight ratio of 93:4:3 to prepare a positive electrode active material composition.

Both surfaces of a 20 μm thick aluminum (Al) thin film, as a positive electrode collector, were coated with the positive electrode active material composition, dried, and then roll-pressed to prepare a positive electrode.

2. Preparation of Pre-lithiated Negative Electrode (1) Formation of First Layers A pure-Si negative electrode active material (initial efficiency: 93%), carbon black and graphite, as conductive agents, and polyacrylic acid as a binder, were mixed in a weight ratio of 70:2:18:10 to prepare 5 g of a mixture. A negative electrode slurry was prepared by adding 8 g of distilled water to the mixture. A 20 μm thick copper (Cu) thin film, as a negative electrode collector, was coated with the negative electrode slurry so that a charge capacity standard (x) was 5.30 mAh/cm$^2$ and a discharge capacity standard was 4.93 mAh/cm$^2$, and then dried. In this case, a temperature of circulating air was 60° C. Subsequently, the coated negative electrode collector was roll-pressed, dried in a vacuum oven at 130° C. for 12 hours, and then punched into a size of 3.4 cm×5.0 cm to prepare the collector on which negative electrode active material layers were formed on both surfaces of the collector (i.e., a negative electrode active material layer is formed on each surface of the collector).

The charge capacity standard and the discharge capacity standard correspond to a charge loading amount and a discharge loading amount of the above-described negative electrode active material, respectively. The charge capacity standard and the discharge capacity standard were values measured after preparing a coin half-cell which included the collector on which the negative electrode active material layers were formed, as a positive electrode, and lithium metal as a negative electrode. Specifically, the charge capacity standard corresponds to a capacity loading amount measured at a charge voltage of 0.005 V to a cut-off current of 0.005 C under constant current (CC)/constant voltage (CV) conditions, and the discharge capacity standard denotes a capacity loading amount corresponding to 1.5 V in the coin half-cell.

A pair of first layers were formed on each surface of each negative electrode active material layers opposite to the current collector, by sputtering as described below. Specifically, the first layers were formed by depositing lithium at a gun power of 60 W for 30 minutes at a vacuum of 10 mtorr by adjusting gas partial pressure in an argon (Ar) atmosphere. In this case, a thickness of each of the first layers formed was 3.93 μm, and a loading amount of each of the first layers was 0.81 mAh/cm$^2$. After determining the irreversible capacity of the coin half-cell which used the lithium metal electrode as a negative electrode and included the collector including the negative electrode active material layers without the first layers as a positive electrode, the loading amount of the first layers was confirmed by calculating a difference between the irreversible capacity of the coin half-cell which used the lithium metal electrode as a negative electrode and included the collector including the negative electrode active material layers without the first layers as a positive electrode and the irreversible capacity of a coin half-cell which included the current collector having the first layers formed on the negative electrode active material layers.

(2) Formation of Second Layers

A pair of second layers were formed on each of the first layers by RF magnetron sputtering as described below. Specifically, the second layers were formed by depositing $Al_2O_3$ at a gun power of 90 W for 1 hour at a vacuum of 10 mtorr by adjusting gas partial pressure in an Ar atmosphere. In this case, the thickness of each of the second layers formed was 150 nm.

3. Preparation of Lithium Secondary Battery

An electrolyte solution was prepared by dissolving 1 M $LiPF_6$ in a solution in which vinylene carbonate was added to a solvent in which ethylene carbonate, diethyl carbonate, and dimethyl carbonate were mixed in a volume ratio of 1:1:2.

After a cell was prepared by a conventional method using the positive electrode and negative electrode thus prepared with a polyethylene separator, the prepared electrolyte solution was injected to prepare a lithium secondary battery.

The prepared lithium secondary battery had a (negative electrode discharge capacity/lithium secondary battery discharge capacity)×100 of 230, the total irreversible capacity of the positive electrode was greater than the total irreversible capacity of the negative electrode, and the relative potential of the negative electrode with respect to lithium metal in an operating voltage range of the lithium secondary battery was in a range of 0 V to 0.6 V.

The negative electrode discharge capacity was a value measured by preparing a coin half-cell which included the negative electrode, as a positive electrode, and the lithium metal as a negative electrode.

COMPARATIVE EXAMPLE 1

A lithium secondary battery was prepared in the same manner as in Example 1 except that a negative electrode without pre-lithiation was used to prepare the lithium secondary battery in Example 1.

The prepared lithium secondary battery had a (negative electrode discharge capacity/lithium secondary battery discharge capacity)×100 of greater than 400, total irreversible capacity of the positive electrode was smaller than total irreversible capacity of the negative electrode, and a relative potential of the negative electrode with respect to lithium metal in an operating voltage range of the lithium secondary battery was in a range of 0 V to 1.3 V.

COMPARATIVE EXAMPLE p 2

A lithium secondary battery was prepared in the same manner as in Example 1 except that a pre-lithiated negative electrode, in which a thickness of each of the first layers was 2.01 μm and a loading amount of each of the first layers was 0.41 mAh/cm$^2$, was prepared in Example 1.

The prepared lithium secondary battery had a (negative electrode discharge capacity/lithium secondary battery discharge capacity)×100 of greater than 300, total irreversible capacity of the positive electrode was greater than total irreversible capacity of the negative electrode, and a relative potential of the negative electrode with respect to lithium metal in an operating voltage range of the lithium secondary battery was in a range of −0.1 V to 0.8 V.

COMPARATIVE EXAMPLE 3

A lithium secondary battery was prepared in the same manner as in Example 1 except that a pre-lithiated negative electrode, in which a thickness of each of the first layers was 7 μm and a loading amount of each of the first layers was 1.44 mAh/cm$^2$, was prepared in Example 1.

The prepared lithium secondary battery had a (negative electrode discharge capacity/lithium secondary battery discharge capacity)×100 of less than 150, total irreversible capacity of the positive electrode was greater than total irreversible capacity of the negative electrode, and a relative potential of the negative electrode with respect to lithium metal in an operating voltage range of the lithium secondary battery was in a range of 0 V to 0.6 V.

Experimental Example 1: Measurement of Change in Usable Range by Pre-Lithiation of Negative Electrode Charge and discharge graphs of the negative electrode and the positive electrode of the lithium secondary batteries of Example 1 and Comparative Example 1 are shown in FIG. 1, wherein the charge and discharge graph of the negative electrode represents a relative potential of the negative electrode with respect to lithium metal.

Figure 1:
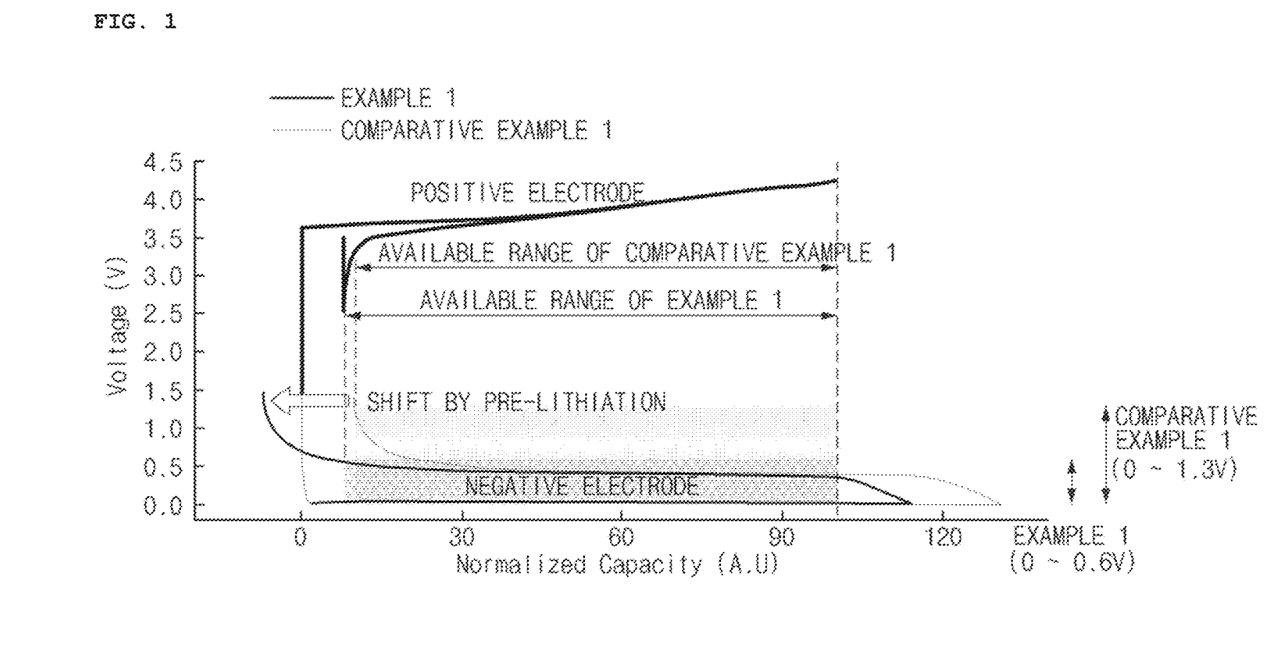
FIG. 1 is charge and discharge graphs of a negative electrode and a positive electrode of lithium secondary batteries of Example 1 and Comparative Example 1, wherein the charge and discharge graph of the negative electrode represents a relative potential of the negative electrode with respect to lithium metal.

As illustrated in FIG. 1, since a portion of charge capacity of the negative electrode may be preferentially charged due to lithium supplied from the first layer, rather than lithium from the positive electrode, as the pre-lithiation treatment of the negative electrode was performed, some of the lithium supplied from the first layers may offset irreversible capacity of the negative electrode and some thereof may be charged into the negative electrode. Thus, a profile of the negative electrode may be shifted from the existing black curve to a blue curve while a profile of the positive electrode was maintained.

Since an available range of the actual battery of Example 1 was widened by some of the lithium supplied from the first layers in comparison to Comparative Example 1, it may be understood that capacity was increased.

With respect to Example 1, the relative potential of the negative electrode with respect to the lithium metal in an operating voltage range of the secondary battery of 4.2 to 2.5 V was in a range of 0 to 0.6 V. In contrast, with respect to Comparative Example 1, the relative potential of the negative electrode with respect to the lithium metal was in a range of 0 to 1.3 V.

As a main degradation mechanism of the negative electrode active materials having a capacity of 1,000 mAh/g or more, battery degradation occurs due to expansion and contraction during battery reaction, wherein the battery degradation mainly occurs during the contraction when a short circuit with a surrounding conductive network occurs, rather than during the expansion when an electrical short circuit is maintained. With respect to Example 1, since a discharge end voltage of the secondary battery was controlled before a threshold potential at which the short circuit with the surrounding conductive network occurred, life characteristic was well maintained, but, with respect to Comparative Example 1, since a negative electrode potential increased above the threshold potential, the negative electrode active material shrank excessively, and thus, it may be understood that the lifetime characteristics were rapidly degraded as in Experimental Example 3.

Experimental Example 2: Energy Density Measurement of Lithium Secondary Battery

In order to measure energy density per volume of the lithium secondary batteries prepared according to the example and comparative examples, the measurement was made by the following experimental method and the results thereof are presented in Table 1 below.

TABLE 1

|  | Example 1 | Comparative Example 1 | Comparative Example 2 | Comparative Example 3 |
|---|---|---|---|---|
| Energy density per volume (Wh/L) | 1000 | 750 | 780 | 830 |

As illustrated in Table 1, it may be confirmed that the lithium secondary battery of the example had significantly better energy density per volume than the lithium secondary batteries of the comparative examples.

Experimental Example 3: Life Characteristics Evaluation of Lithium Secondary Battery Life characteristics of the lithium secondary batteries prepared according to the example and comparative examples were evaluated by the following experimental method.

Specifically, after the lithium secondary batteries were charged at 0.5 C to a charge end voltage of 4.4 V, the lithium secondary batteries were discharged at 1 C to a discharge end voltage of 2.5 V, 500 cycles of discharge were performed to evaluate the life characteristics, and the results of measuring discharge capacity retention are presented in Table 2.

Discharge capacity retention (%)-(nth cycle discharge capacity)/(1St cycle discharge capacity)×100

TABLE 2

|  | Example 1 | Comparative Example 1 | Comparative Example 2 | Comparative Example 3 |
|---|---|---|---|---|
| Discharge capacity retention (%) | 82 | 0 | 35 | 0 |

As illustrated in Table 2, with respect to the lithium secondary battery of the example, since discharge capacity was maintained at 80% or more even after 500 cycles or more, it may be confirmed that the life characteristics were significantly better than those of the comparative examples.

Although the exemplary embodiments of the present invention have been described, it will be understood by those of ordinary skill in the art that various changes in form and details may be made therein without departing from the spirit and scope of the invention as defined by the following claims. Accordingly, it is to be understood that the present invention has been described by way of illustration and not limitation.

The invention claimed is:

1. A lithium secondary battery, comprising:
   a negative electrode;
   a positive electrode;
   a separator; and
   an electrolyte,
   wherein the negative electrode comprises:
   a current collector;
   a pair of negative electrode active material layers comprising a negative electrode active material, disposed on both surfaces of the current collector;
   a pair of first layers disposed on respective surfaces of the negative electrode active material layers opposite the current collector, wherein the pair of first layers comprise lithium; and
   a pair of second layers disposed on respective surfaces of the first layers, wherein the pair of second layers comprise an inorganic material,
   wherein each of the first layers has a thickness of 2.5 µm to 4.5 µm and each of the second layers has a thickness of 100 nm to 200 nm,
   wherein a total irreversible capacity of the positive electrode is greater than a total irreversible capacity of the negative electrode while the lithium secondary battery satisfies Equation 1, and
   a relative potential of the negative electrode with respect to lithium metal in an operating voltage range of the lithium secondary battery is in a range of −0.1 V to 0.7 V:

$$150 < (\text{negative electrode discharge capacity/lithium secondary battery discharge capacity}) \times 100 < 300 \quad \text{Equation 1}$$

wherein, the negative electrode discharge capacity is a value measured by preparing a coin half-cell which includes the negative electrode, as a positive electrode, and the lithium metal as a negative electrode.

2. The lithium secondary battery of claim 1, wherein the relative potential of the negative electrode with respect to the lithium metal in the operating voltage range of the lithium secondary battery is in a range of 0 V to 0.6 V.

3. The lithium secondary battery of claim 1, wherein each of the first layers has a thickness of 3.0 μm to 4.0 μm.

4. The lithium secondary battery of claim 1, wherein the negative electrode active material has a capacity of 1,000 mAh/g or more.

5. The lithium secondary battery of claim 1, wherein the negative electrode active material comprises at least one selected from the group consisting of silicon, tin, titanium, aluminum, lead, zinc, bismuth, indium, magnesium, gallium, and cadmium.

6. The lithium secondary battery of claim 1, wherein the positive electrode comprises a positive electrode active material represented by a formula of $LiNi_{1-a}M_aO_2$, wherein M is at least one selected from the group consisting of cobalt, manganese, aluminum, copper, iron, magnesium, boron, and gallium, and a satisfies $0.01 \leq a \leq 0.3$.

7. The lithium secondary battery of claim 1, wherein the inorganic material comprises at least one selected from the group consisting of $Al_2O_3$, $SiO_2$, and $ZrO_2$.

8. The lithium secondary battery of claim 1, wherein the lithium secondary battery has an energy density per volume of 800 Wh/L or more.

9. The lithium secondary battery of claim 1, wherein a capacity retention of the lithium secondary battery is maintained at 60% or more after 500 cycles or more.

* * * * *